United States Patent [19]

Denzinger et al.

[11] Patent Number: 4,818,794

[45] Date of Patent: Apr. 4, 1989

[54] SLIGHTLY CROSSLINKED, WATER-SOLUBLE POLYMALEIC ACID, ITS PREPARATION AND ITS USE

[75] Inventors: Walter Denzinger, Speyer; Heinrich Hartmann, Limburgerhof; Ulrich Goeckel, Boehl-Iggelheim; Felix Richter, Bruehl; Hans-Juergen Raubenheimer, Ketsch; Ekhard Winkler, Mutterstadt, all of Fed. Rep. of Germany

[73] Assignee: BASF Aktiengesellschaft, Ludwigshafen, Fed. Rep. of Germany

[21] Appl. No.: 94,766

[22] Filed: Sep. 10, 1987

[30] Foreign Application Priority Data

Sep. 19, 1986 [DE] Fed. Rep. of Germany ....... 3631814

[51] Int. Cl.$^4$ .............................................. C08F 8/12
[52] U.S. Cl. .............................. 525/327.8; 525/327.4; 526/227; 526/232; 526/271
[58] Field of Search .................. 525/327.4, 327.8; 526/271, 272, 227, 232

[56] References Cited

U.S. PATENT DOCUMENTS

| | | | |
|---|---|---|---|
| 2,471,818 | 5/1945 | Hunter et al. | 525/327.8 |
| 2,490,489 | 12/1949 | Tauch | 525/327.8 |
| 2,565,147 | 8/1951 | Pfluger | 525/327.8 |
| 2,647,886 | 8/1953 | Seymour | 525/327.8 |
| 2,876,894 | 3/1959 | Dahlquist et al. | 525/327.8 |
| 3,073,805 | 1/1963 | Reinhard | 525/327.8 |
| 3,073,806 | 1/1963 | Reinhard | 525/327.8 |
| 3,165,486 | 1/1965 | Johnson | 525/327.8 |
| 3,448,088 | 6/1969 | Azorlosa | 526/271 |
| 3,637,609 | 1/1972 | Blumbergs | 525/327.8 |
| 3,755,264 | 8/1973 | Testa | 525/327.8 |
| 4,027,082 | 5/1977 | Gavrilova et al. | 525/327.8 |
| 4,062,817 | 12/1977 | Westerman | 525/327.8 |
| 4,126,738 | 11/1978 | Gaylord | 525/327.8 |
| 4,387,186 | 6/1983 | Williams et al. | 525/327.8 |
| 4,539,353 | 9/1985 | Abel et al. | 525/327.4 |
| 4,670,514 | 6/1987 | Burke | 525/327.8 |

FOREIGN PATENT DOCUMENTS

| | | | |
|---|---|---|---|
| 1161581 | 1/1984 | Canada | 525/327.8 |
| 0068847 | 1/1983 | European Pat. Off. | 525/327.8 |
| 0846019 | 8/1960 | United Kingdom | 525/327.8 |
| 1069637 | 8/1967 | United Kingdom | 525/327.8 |

Primary Examiner—Joseph L. Shofer
Assistant Examiner—J. Reddick
Attorney, Agent, or Firm—John C. Demeter

[57] ABSTRACT

Slightly crosslinked, water-soluble polymaleic acid which is obtainable by polymerization of maleic anhydride with from 0.1 to 10% by weight of a crosslinking agent in an aromatic hydrocarbon at from 60 to 200° C. in the presence of from 1 to 20% by weight, based on maleic anhydride, of a peroxyester, and hydrolysis of the polymer to give slightly crosslinked polymaleic acid having a Fikentscher K value of from 8 to 20 (measured at 20° C. in 5% strength aqueous solution at pH 7 as the Na salt), a process for the preparation of slightly crosslinked polymaleic acid, and its use as a water treatment agent for reducing boiler scale and hard water deposits in water-conveying systems.

8 Claims, No Drawings

SLIGHTLY CROSSLINKED, WATER-SOLUBLE POLYMALEIC ACID, ITS PREPARATION AND ITS USE

British Pat. No. 1,024,725 discloses a process for the preparation of polymaleic anhydride, in which maleic anhydride is polymerized in an inert solvent, for example a dialkyl ether, tetrahydrofuran, dioxane, benzene or a chlorohydrocarbon, such as chloroform, in the presence of an organic percarbonate or diacyl peroxide. Particularly preferred solvents are benzene and chloroform. Polymerization initiators used are, for example, diisopropyl percarbonate, dibenzoyl peroxide and dicyclohexyl percarbonate, in amounts of from 2 to 40% by weight, based on maleic anhydride. The polymers thus prepared contain substantial amounts of unpolymerized maleic anhydride.

In the process of British Patent 1,411,063, polymaleic anhydride is obtained by polymerization of maleic anhydride in xylene as the solvent, which contains up to 99% of ortho-xylene, di-tert-butyl peroxide being used as the polymerization initiator, in an amount of from 15 to 40% by weight, based on maleic anhydride. The polymers prepared by this process also contain a substantial amount of unpolymerized maleic anhydride.

U.S. Pat. No. 3,810,834 discloses that hydrolyzed polymaleic anhydrides having a molecular weight of from 300 to 5,000 before the hydrolysis or water-soluble salts of such hydrolyzed polymaleic anhydrides are used in the water treatment, boiler scale formation being reduced and in many cases virtually completely prevented. The polymers suitable for this purpose are prepared by polymerization of maleic anhydride in toluene using benzoyl peroxide, followed by hydrolysis of the resulting polymaleic anhydride. Since the polymerization of the maleic anhydride is not complete and separation of unpolymerized maleic anhydride from the polymer is difficult, the polymaleic acids contain substantial amounts of maleic acid.

It is an object of the present invention to provide water-soluble polymaleic acids which have a broader molecular weight distribution than the polymaleic acids known to date, and a process for the preparation of these polymaleic acids, in which polymers are obtained whose content of free maleic acid is substantially lower than the maleic acid content of the known polymaleic acids. It is a further object of the present invention to provide products for reducing boiler scale or hard water deposits in water-conveying systems, the said products being more effective than polymaleic acids used to date.

We have found that these objects are achieved, according to the invention, by a slightly crosslinked, water-soluble polymaleic acid which is obtainable by polymerization of maleic anhydride with from 0.1 to 10% by weight, based on maleic anhydride, of a crosslinking agent containing 2 or more ethylenically unsaturated double bonds in an aromatic hydrocarbon at from 60° to 200° C. in the presence of from 1 to 20% by weight, based on maleic anhydride, of a peroxyester derived from a saturated or ethylenically unsaturated carboxylic acid, and hydrolysis of the polymer containing anhydride groups to give slightly crosslinked polymaleic acid having a Fikentscher K value of from 8 to 20 (measured in aqueous solution at pH 7 as the sodium salt and at a polymer concentration of 5% by weight). The slightly crosslinked, water-soluble polymaleic acids are effective agents in the treatment of water for the prevention of boiler scale formation or hard water deposits in water-conveying systems.

The slightly crosslinked, water-soluble polymaleic acids are obtained by polymerization of maleic anhydride in the presence of from 0.1 to 10% by weight, based on maleic anhydride, of a crosslinking agent in an aromatic hydrocarbon or a mixture of such hydrocarbons. Examples of suitable aromatic hydrocarbons are benzene, toluene, xylene, ethylbenzene, o-, m- and p-diethylbenzene, isopropylbenzene, n-propylbenzene, p-diisopropylbenzene and tetralin. The isomers of xylene (o-, m- and p-xylene) can be used either in pure form or in the form of mixtures which are commercially available as industrial xylene. Preferably used aromatic hydrocarbons are toluene and o-xylene.

Suitable crosslinking agents are monomers which contain 2 or more ethylenically unsaturated, nonconjugated double bonds. Examples of suitable crosslinking agents of this type are diacrylates and dimethacrylates of dihydric or polyhydric saturated alcohols, eg. ethylene glycol diacrylate, ethylene glycol dimethacrylate, 1,2-propylene glycol diacrylate, 1,2-propylene glycol dimethacrylate, butane-1,4-diol diacrylate, butane-1,4-diol dimethacrylate, hexanediol diacrylate, hexanediol dimethacrylate, neopentylglycol diacrylate, neopentyl glycol dimethacrylate, 3-methylpentanediol acrylate and 3-methylpentanediol dimethacrylate. Other suitable crosslinking agents are the acrylates and methacrylates of alcohols containing more than 2 OH groups, eg. trimethylolpropane triacrylate or trimethylolpropane trimethacrylate. Another class of crosslinking agents comprises diacrylates and dimethacrylates of polyethylene glycols or polypropylene glycols, each having molecular weights of from 200 to 9,000. Polyethylene glycols and polypropylene glycols which are used for the preparation of the diacrylates or dimethacrylates each preferably have a molecular weight of from 400 to 2,000. In addition to the homopolymers of ethylene oxide and propylene oxide, it is also possible to use block copolymers of ethylene oxide and propylene oxide or copolymers of these, which contain the ethylene oxide and propylene oxide units in random distribution. The oligomers of ethylene oxide and propylene oxide are also suitable for the preparation of the crosslinking agents, examples being diethylene glycol diacrylate, diethylene glycol dimethacrylate, triethylene glycol diacrylate, triethylene glycol dimethacrylate, tetraethylene glycol diacrylate and/or tetraethylene glycol dimethacrylate. Other suitable crosslinking agents are vinyl esters of ethylenically unsaturated $C_3$–$C_6$-carboxylic acids, e.g. vinyl acrylate, vinyl methacrylate or vinyl itaconate. Suitable crosslinking agents are, furthermore, vinyl esters of saturated carboxylic acids containing 2 or more carboxyl groups and di- and polyvinyl ethers of dihydric or polyhydric alcohols, e.g. divinyl adipate, butanediol divinyl ether and trimethylolpropane trivinyl ether. Other crosslinking agents are allyl esters of ethylenically unsaturated carboxylic acids, e.g. allyl acrylate and allyl methacrylate, allyl ethers of polyhydric alcohols, e.g. pentaerithritol triallyl ether, triallyl sucrose and pentaallyl sucrose. Methylenebisacrylamide, methylenebismethacrylamide, divinylethyleneurea, divinylpropyleneurea, divinylbenzene, divinyldioxane, tetraallylsilane and tetravinylsilane are also suitable crosslinking agents.

The crosslinking agents can be used either alone or in the form of mixtures for the polymerization of the maleic anhydride. They are preferably employed in an amount of from 0.2 to 5% by weight, based on maleic anhydride. Preferred crosslinking agents are diacrylates and dimethacrylates derived from polyethylene glycols and/or polypropylene glycols having a molecular weight of from 400 to 2,000.

Polymerization initiators used according to the invention are peroxyesters formally derived from saturated or ethylenically unsaturated carboxylic acids. The primary esters of the peracids are generally prepared by reacting the barium salts of primary alkyl hydroperoxides with acyl chlorides, while the tertiary alkyl esters of peracids are obtainable by the simultaneous addition of a dilute alkali and an acyl chloride to a tert-alkyl hydroperoxide. The carboxylic acid moiety of the peroxyester molecule is derived from saturated $C_1$-$C_{18}$-carboxylic acids or from ethylenically unsaturated $C_3$-$C_{18}$-carboxylic acids, preferably from saturated or ethylenically unsaturated carboxylic acids of 4 to 10 carbon atoms. The suitable peroxyesters can be represented in a simplified manner by the following formulae:

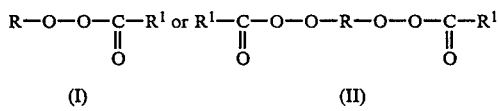

(I)    (II)

In formulae I and II, $R^1$ is a saturated $C_1$-$C_{17}$-alkyl radical or aryl radical, H or an ethylenically unsaturated $C_2$-$C_{17}$-alkenyl radical which may furthermore carry a carb-oxyl group, and R is $C_3$-$C_{22}$-alkyl or an alkyl group which has one or more aromatic substituents, e.g. the cumyl group. R may furthermore be alkylene and is preferably tert-butyl or tert-amyl.

Examples of suitable alkyl and aralkyl peroxyesters of carboxylic acids are cumyl perneodecanoate, tert-butyl perneodecanoate, tert-amyl perneodecanoate, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl- perbenzoate, 2,5-dimethylhexane 2,5-diperbenzoate and tert-butyl per-3,5,5-trimethylhexanoate. The stated alkyl peresters can be used either alone or as a mixture in the polymerization. Preferably, tert-butyl perpivalate, tert-butyl per-2-ethylhexanoate or tert-butyl perbenzoate is used as the sole initiator or these peroxyester s are used as a mixture with one another or with other alkyl peroxyesters. The peroxyesters are used in an amount of from 1 to 20, preferably from 5 to 16, % by weight, based on the maleic anhydride employed in the polymerization.

The slightly crosslinked, water-soluble polymaleic acid is prepared in two stages. In the first process stage, maleic anhydride in an aromatic hydrocarbon is polymerized in the presence of from 0.1 to 10% by weight, based on maleic anhydride, of a crosslinking agent containing 2 or more ethylenically unsaturated, nonconjugated bonds, in an aromatic hydrocarbon, at from 60° to 200° C., in the presence of the abovementioned peroxyesters. The concentration of the maleic anhydride in solution in the aromatic hydrocarbon is from 20 to 80, preferably from 30 to 70, % by weight, i.e. from 0.25 to 4, preferably from 0.43 to 2.33, parts by weight of an aromatic hydrocarbon are used per part by weight of maleic anhydride. The polymerization is preferably carried at from 80° to 150° C. For fairly small batches where the resulting heat of polymerization can readily be removed, it is possible to polymerize a solution of maleic anhydride and a crosslinking agent in an aromatic hydrocarbon by adding a peroxyester and heating the mixture to a temperature in the stated range. On the other hand, it is more advantageous if a solution of maleic anhydride and the crosslinking agent in one or more aromatic hydrocarbons is initially taken in a reactor and heated to the temperature required for the polymerization, and the peroxyester, dissolved in an aromatic solvent or an inert solvent, is metered in continuously or a little at a time according to the progress of the polymerization reaction. In another version of the process, the aromatic hydrocarbon is heated to a temperature in the abovementioned range, and maleic anhydride, the crosslinking agent and the polymerization initiator are fed in continuously or batchwise at the rate at which the polymerization proceeds.

However, the polymerization can also be carried out as follows: some of the mixture to be polymerized, for example from 5 to 10% of the total batch, is heated to 60°-200° C. in a polymerization reactor so that the polymerization begins, and the remainder of the components to be polymerized are then fed continuously or batchwise to the initially taken mixture heated at the polymerization temperature, either in the form of a mixture (mixture of maleic anhydride, crosslinking agent and peroxyester, dissolved in an aromatic hydrocarbon) or in the form of solutions of maleic anhydride and crosslinking agent or solutions of one or more peroxyesters in an aromatic hydrocarbon. The polymerization is preferably carried out under an inert gas atmosphere, for example under nitrogen. In order to remove the heat formed during the polymerization, it is technically simplest to carry out the polymerization at the boiling point of the aromatic hydrocarbon, because the heat of polymerization can then be removed from the system by means of evaporative cooling. The use of mixtures of several aromatic hydrocarbons makes it possible to set the of polymerization temperatures. Another possible method of carrying out the polymerization at the boiling point of the particular aromatic hydrocarbon used or of a mixture of aromatic hydrocarbons is to carry out the polymerization under reduced or superatmospheric pressure, depending on the desired polymerization temperature. In addition to the substantially batchwise polymerizations described above, the process can also be carried out continuously for the preparation of relatively large amounts of slightly crosslinked, water-soluble polymaleic anhydride. For the continuous polymerization, a cascade of two or more polymerization reactors connected in series is required in most cases. In a continuous process, monomer feeds of different compositions are metered continuously into the first two reactors. In this procedure, it is also possible to feed the total amount of monomers to the first reactor and to distribute the required amounts of initiator over 2 or 3 reactors.

In order to prepare polymers having a particularly low residual monomer content, the main polymerization can be followed by a subsequent polymerization which is carried out either at the same temperature as the main polymerization or at a temperature which is from 10° to 40° C. higher. Peroxyesters are preferably used in the subsequent polymerization, a total of from 1 to 20% by weight of the peroxyester being required for the main and subsequent polymerizations. In the main polymerization, it is possible to use the total amount of peroxyester and then carry out the subsequent polymerization or to use from 80 to 95% of the required amount of initiator in the main polymerization and, when the latter is complete, to add the remaining amount of initiator and carry out subsequent polymerization.

The crosslinking agents polymerize virtually completely under the reaction conditions. The conversion of maleic anhydride is higher than 99%, so that slightly crosslinked polymers of maleic anhydride which contain less than 1% by weight of unpolymerized maleic anhydride are obtained. The structure of the said polymers is not known. However, the balance of quantities, the elemental analysis and the IR spectra indicate that the slightly crosslinked polymer contains not only polymerized maleic anhydride and polymerized crosslinking agent but also the particular aromatic hydrocarbon used and decomposition products of the peroxyesters in bound form. Up to 75, preferably from 10 to 65, % by weight, based on maleic acid, of aromatic hydrocarbon and decomposition products of the initiator are incorporated into the slightly crosslinked polymaleic acid if it is assumed that conversion of maleic anhydride to polymaleic anhydride is 100%. The polymerization of the maleic anhydride in the presence of from 0.1 to 10% by weight of crosslinking agents according to the invention gives, depending on the choice of solvent, clear polymer solutions (for example in ethylbenzene) or precipitates of the polymers or two separate phases, each containing polymer and the lower phase having an oily consistency at above 90° C. and solidifying on cooling. The upper phase essentially consists of a solution (for example in the case of polymerization in xylene). The polymers, which are present in the two different phases, have different performance characteristics. However, they can both be used together for the same purpose and therefore need not be separated. However, it is also possible to carry out separation or fractionation of the polymer batch, in which case particularly effective water treatment agents can be prepared. The aromatic hydrocarbons not incorporated into the polymer during the polymerization can be recovered and reused for the polymerization, even without purification. The polymerization of the maleic anhydride with the crosslinking agents is carried out in the absence of water. The aromatic hydrocarbons used in the polymerization are virtually anhydrous or contain no more than 0.2% by weight of water, i.e. amounts of water which, when the water is in contact with the aromatic hydrocarbon, are dissolved therein.

In a second process step, the products prepared in the polymerization are hydrolyzed. For this purpose, water can be added to prepare polymers in the acid form and the reaction mixture can be heated to 70°–150° C. in order to complete the hydrolysis of the anhydride groups of the crosslinked polymer. If the hydrolysis of the polymer is carried out at above the boiling points of the solvent/water mixtures, the reaction is carried out under super-atmospheric pressure. The aromatic hydrocarbon used in the polymerization can be distilled off from the resulting aqueous polymer solution before or after the hydrolysis. However, the polymers can also be precipitated from the reaction mixture obtained in the polymerization, by adding a solvent in which they are insoluble, and can then be hydrolyzed.

If desired, the aqueous solution of the slightly crosslinked polymaleic acid can be neutralized with an alkali, ammonia or an amine. To prepare the salts of the said polymaleic acid, it is preferable if the reaction mixture obtained in the polymerization is neutralized with an aqueous solution of an alkali metal base, ammonia or an amine. In these cases too, the aromatic hydrocarbon can be distilled off during or after the neutralization or reused. In all cases, aqueous solutions of salts of a slightly crosslinked polymaleic acid are obtained. Preferably used alkali metal bases are sodium hydroxide solution and potassium hydroxide solution. The neutralization can also be effected with ammonia or an amine, e.g. triethylamine, hexylamine, ethanolamine, triethanolamine or morpholine. However, the hydrolysis of the anhydride groups of the slightly crosslinked polymer can be carried out not only with water but also with aqueous solutions of bases or acids. If the slightly crosslinked polymers of maleic acid in the acid form are water-insoluble, they are converted by neutralization with a base into the alkali metal salt, which is water-soluble.

The K value of the slightly crosslinked, water-soluble polymaleic acids is from 7 to 20, preferably from 8.5 to 15 (determined as the sodium salt in 5% strength aqueous solution at 25° C. and pH 7). The said polymaleic acids contain less than 1% by weight of monomeric maleic acid (determined polarographically). The aqueous solutions of the hydrolyzed polymers can therefore be used directly, without further purification, to reduce or suppress scaling or hard water deposits in water-conveying systems.

The mode of action of these scale inhibitors consists in preventing the formation of crystals of the salts causing hardness, such as calcium carbonate, magnesium oxide, magnesium carbonate, calcium, barium and strontium sulfate, calcium phosphate (apatite) and the like, when metered in substoichiometric amounts, or in influencing the formation of these precipitates in such a way that, instead of hard and stone-like deposits, precipitates which are readily washed away and are finely distributed in the water are formed. In this way, the surfaces of, for example, heat exchangers, pipes and pump components are kept free of deposits and their tendency to corrosion is reduced. In particular, the danger of pitting under these deposits is reduced, and, furthermore, the growth of microorganisms on these metal surfaces is inhibited. As a result of the effect of these scale inhibitors, the life of such systems can be increased and down times for cleaning parts of the system can be substantially reduced. The amounts of scale inhibitor required for this purpose are only from 0.1 to 100 ppm, based on the particular amount of water. The water-conveying systems are, for example, open or closed cooling circulations, for example in power stations or chemical plants, such as reactors, distillation apparatuses and similar components, in which heat has to be removed. These scale inhibitors can also be used in boiler waters and steam generators, preferably at water temperatures below 150° C. Another preferred application of the novel scale inhibitors is for the desalination of sea water and brackish water by distillation or membrane processes, for example reverse osmosis or electrodialysis. For example, in the MSF distillation process for the desalination of sea water, concentrated sea water is circulated at elevated temperatures. The novel scale inhibitors effectively suppress the precipitation of salts causing hardness, such as brucite, and caking of these salts on plant components.

In membrane processes, damage to the membranes by crystallizing hardness-producing salts can be effectively prevented. These scale inhibitors thus permit higher concentration factors, improved yield of pure water and longer membrane lives. Another application of these scale inhibitors is, for example, in the concentration of sugar cane or sugar beet liquors. In contrast to the applications described above, in this case, for example, calcium hydroxide, carbon dioxide, sulfur dioxide or, if appropriate, phosphoric acid is added to the clarified juice to effect purification. Sparingly soluble calcium salts, e.g. calcium carbonate, sulfate or phosphate, which remain in the sugar liquor after filtration, are then precipitated during the concentration process and may occur as stone-hard deposits on heat exchanger surfaces. This also applies to impurities in the sugar, such as silica or calcium salts of organic acids such as oxalic acid.

The same applies to processes which follow the sugar recovery, for example the production of alcohol from residues obtained in sugar production.

The novel scale inhibitors are capable of substantially suppressing the formation of these deposits, so that down times for cleaning the plant, for example by boiling, can be substantially reduced. Another important aspect here is the considerable energy saving as a result of avoiding the said heat-insulating deposits.

The amounts of scale inhibitor which are required for the applications described are variable but are from 0.1 to 100 ppm, based on the cooling water, boiler water or process water used or, for example, on the sugar liquor.

The hydrolyzed crosslinked polymers of maleic acid can furthermore be incorporated into detergent formulations as incrustation inhibitors and antiredeposition agents in an amount of from 0.5 to 10% by weight. The slightly crosslinked water-soluble polymaleic acids are also suitable as water hardness stabilizers in cleaner formulations. They are also suitable, in an amount of from 0.1 to 5% by weight, as dispersants for pigments, for example for the production of highly concentrated aqueous suspensions of clay or chalk for the preparation of paper coating slips.

In the Examples, parts and percentages are by weight. The K values of the hydrolyzed polymers were determined according to H. Fikentscher, Cellulose-Chemie, 13 (1932), 48–64 and 71–74, in aqueous solution at pH 7, 25° C. and a concentration of the sodium salt of the polymer of 5% by weight.

EXAMPLE 1

A solution of 400 g of maleic anhydride and 8 g of butanediol diacrylate in 600 g of o-xylene is heated to 146° C. (refluxing) in a 2 l glass reactor provided with a stirrer, a thermometer, a nitrogen inlet, a condenser, feed vessels and an apparatus for passing in steam. As soon as the solution begins to boil, a solution of 60 g of tert-butyl per-2-ethylhexanoate in 100 g of o-xylene is metered in over 5 hours. The polymerization is carried out under reflux with thorough mixing. The temperature falls from 146° C. to 140° C. in the course of the polymerization. When the addition of initiator is complete, the reaction mixture is heated at the boil for a further hour and hen cooled to 97° C. and hydrolyzed by adding 300 g of water. Steam is then passed into the reaction mixture, and the unconverted o-xylene is removed azeotropically. A clear yellow aqueous solution having a solids content of 61% remains. The slightly crosslinked polymaleic acid has a K value of 9.7 in the form of the sodium salt. The residual monomer content, based on the solids content, is 0.16% of maleic acid. The yield of the said polymaleic acid is 129%, based on maleic acid, the amount of which is calculated from the maleic anhydride used.

EXAMPLE 2

Example 1 is repeated, except that the amount of crosslinking agent is increased to 20 g. A brown, virtually clear aqueous solution having a solids content of 64.5% is obtained. The slightly crosslinked polymaleic acid has a K value of 10.3 in the form of the sodium salt. The residual monomer content, based on the solids content, is 0.36% of maleic acid. The yield of the said polymaleic acid is 132%, based on maleic acid, the amount of which is calculated from the maleic anhydride used.

EXAMPLE 3

Example 1 is repeated, except that, instead of the amount of crosslinking agent used there, 40 g of butanediol diacrylate is now employed. A brown cloudy aqueous solution having a solids content of 584% is obtained. The slightly crosslinked polymaleic acid has a K value of 11.9 in the form of the sodium salt. The residual monomer content, based on the solids content, is 0.45% of maleic acid. The yield of slightly crosslinked, water-soluble polymaleic acid is 134%, based on maleic acid, the amount of which is calculated from the maleic anhydride used.

EXAMPLE 4

A solution of 400 g of maleic anhydride and 20 g of a diacrylate of a polyethylene glycol having a molecular weight of 1500 in 600 g of o-xylene is heated at the boil in the apparatus described in Example 1, and a solution of 60 g of tert-butyl per-2-ethylhexanoate in 100 g of o-xylene is added under a nitrogen atmosphere and with stirring, in the course of 5 hours. When the addition of the initiator is complete, the reaction mixture is heated at the boil for a further hour to continue the polymerization and then cooled to 95° C. At this temperature, 300 g of water are then added, and the unpolymerized o-xylene is removed by passing in steam. A brown aqueous solution having a solids content of 60% remains. The slightly crosslinked polymaleic acid has a K value of 10.1 in the form of the sodium salt. The residual monomer content, based on the solids content, is 0.17% of maleic acid. The yield of the said polymaleic acid is 128%, based on maleic acid, the amount of which is calculated from the maleic anhydride used.

EXAMPLE 5

Example 4 is repeated, except that the amount of crosslinking agent is increased to 40 g. Here too, the diacrylate of a polyethylene glycol having a molecular weight of 1500 is used as the crosslinking agent. A brown aqueous solution of a slightly crosslinked polymaleic acid is obtained. The solids content of the aqueous solution is 56.9%. The said polymaleic acid has a K value of 10.7 in the form of the sodium salt. The residual monomer content, based on the solids content, is 0.19% of maleic acid. The yield of the said polymaleic acid is 132%, based on maleic acid, the amount of which is calculated from the maleic anhydride used in the polymerization.

COMPARATIVE EXAMPLE 1

A stirred solution of 300 g of maleic anhydride in 300 g of industrial xylene is refluxed in the polymerization reactor stated in Example 4. As soon as the solution begins to boil, a solution of 100 g of di-tert-butyl peroxide, dissolved in 150 g of industrial xylene, is added continuously in the course of 2 hours. As the polymerization progresses, the boiling point of the reaction mixture falls from 136° C. to 125° C. When the addition of the initiator is complete, the reaction mixture is polymerized for a further 4 hours at 125° C., cooled to 95° C. and then hydrolyzed by adding 300 g of water. The aromatic hydrocarbons used as solvents and not incorporated in the polymer are removed azeotropically by passing in steam. A clear brown aqueous solution of polymaleic acid having a solids content of 48.7% is obtained. The polymaleic acid has a K value of 10.1 in the form of the sodium salt. The content of unpolymerized maleic acid is 4.1%, based on the solids content of the aqueous solution.

COMPARATIVE EXAMPLE 2

Comparative Example 1 is repeated, except that, instead of the initiator solution used there, a solution of 45 g of di-tert-butyl peroxide in 150 g of industrial xylene is now employed. This gives a deep brown clear aqueous solution which contains 86%, based on the solids content, of unpolymerized maleic acid.

COMPARATIVE EXAMPLE 3

A solution of 300 g of maleic anhydride in 300 g of o-xylene is polymerized in the apparatus stated in Example 4. The maleic anhydride solution in xylene is heated to the boil, and a solution of 100 g of di-tert-butyl peroxide in 150 g of o-xylene is added continuously at the boiling point in the course of 2 hours. As the polymerization proceeds, the boiling point of the reaction mixture falls from 146° C. to 127° C. When the addition of the initiator is complete, the reaction mixture is refluxed for a further 4 hours and then cooled to 95° C., and 300 g of water are added to effect hydrolysis. The o-xylene used as the solvent is then removed by steam distillation. A clear brown aqueous solution of polymaleic acid, having a solids content of 62.4%, is obtained. The residual monomer content is 18.5%, based on solids.

COMPARATIVE EXAMPLE 4

A solution of 877 g of maleic anhydride in 877 g of industrial xylene is refluxed in a 4 l reactor provided with a stirrer, a thermometer, a nitrogen inlet, a condenser, a feed vessel and an apparatus for passing in steam. As soon as the solution begins to boil, a solution of 292 g of tert-butyl hydroperoxide in 350 g of industrial xylene is added continuously under a nitrogen atmosphere and with constant stirring, in the course of 2 hours. When the addition of the initiator is complete, the mixture is heated at the boil for a further 4 hours and then cooled to 96° C., 600 g of water are added and the mixture is then subjected to steam distillation in order to remove the industrial xylene. A clear brown aqueous solution having a solids content of 55.9% results. The content of unpolymerized maleic acid is 10.5%, based on the solids content.

COMPARATIVE EXAMPLE 5

A solution of 100 g of maleic anhydride in 100 g of industrial xylene is heated at the boil under nitrogen and with stirring in the apparatus described in Example 1, and a solution of 15 g of tert-butyl hydroperoxide in 50 g of industrial xylene is added continuously in the course of 2 hours. When the addition of the initiator is complete, the reaction mixture is heated at the boil for a further 4 hours and then cooled to 94° C., 50 g of water are added and the mixture is subjected to steam distillation. A clear brown solution having a solids content of 56.5% is obtained. The content of unpolymerized maleic acid is 34.2%, based on the solids content.

COMPARATIVE EXAMPLE 6

Comparative Example 5 is repeated, except that, instead of the initiator solution used there, a solution of 15 g of dicumyl peroxide in 50 g of industrial xylene is now used. A clear brown aqueous solution having a solids content of 54.3% is obtained. The content of maleic acid in the polymer solution is 30%, based on the solids content.

COMPARATIVE EXAMPLE 7

A solution of 400 g of maleic anhydride in 600 g of o-xylene is initially taken in the apparatus described in Example 4 and heated at the boil with stirring in a stream of nitrogen. As soon as the solution begins to boil, a solution of 60 g of dilauroyl peroxide in 200 g of o-xylene is metered in continuously in the course of 5 hours. When the addition of the initiator is complete, the reaction mixture is heated at the boil for a further hour and then cooled to 95° C., and 300 g of water are added to hydrolyze the polymer. The unconverted o-xylene is removed by steam distillation. A clear yellow aqueous solution having a solids content of 51% results. The aqueous solution contains 23%, based on the solids content, of maleic acid.

COMPARATIVE EXAMPLE 8

A solution of 100 g of maleic anhydride in 233 g of industrial xylene is heated to the boil, under nitrogen and with thorough mixing, in the apparatus described in Comparative Example 5, and, when the solution begins to boil, a solution of 7.5 g of 2,2'-azobisisobutyronitrile in 50 of industrial xylene is added in the course of 2 hours. The polymerization is carried out at the boiling point of the reaction mixture. When the addition of the initiator is complete, the reaction mixture is heated at the boil for a further 4 hours and then cooled to 97° C., 50 g of water are added and the mixture is subjected to steam distillation. A clear reddish brown aqueous solution having a solids content of 54.2% results. The aqueous polymer solution contains 13.3%, based on the solids content, of maleic acid.

COMPARATIVE EXAMPLE 9

Comparative Example 8 is repeated, except that a solution of 7.5 g of 2,2'-azobis-(2,4-dimethylvaleronitrile) in 50 g of industrial xylene is used as the polymerization initiator. A clear reddish brown aqueous polymer solution having a solids content of 56.3% is obtained. The content of maleic acid is 42.9%, based on the solids content.

COMPARATIVE EXAMPLE 10

Comparative Example 7 is repeated, except that, instead of the initiator solution described there, an initiator solution consisting of 60 g of methyl ethyl ketone peroxide in 100 g of o-xylene is employed. A blackish brown aqueous solution having a solids content of 53.1% is obtained. The aqueous solution contains 78.4%, based on the solids content, of maleic acid.

The Comparative Examples clearly show that the polymerization initiators previously described for the polymerization of maleic anhydride give polymers having a high residual monomer content. The residual monomer content of the aqueous polymer solutions obtained according to Comparative Examples 2 to 10 were so high that it was impossible to determine the K value. However, the Comparative Examples also show that substantial amounts of di-tert-butyl peroxide are required for the polymerization of maleic anhydride before a more or less satisfactory conversion is obtained in the polymerization. In contrast, a conversion which is higher than 99% is obtained using the peroxyesters according to the present invention in the polymerization of maleic anhydride in the presence of crosslinking agents. The content of maleic acid in the hydrolyzed products was less than 1% in every case. The high conversion in the novel process and the low content of maleic acid in the hydrolyzed, slightly crosslinked polymers is surprisingly achieved with a smaller amount of initiator compared with the prior art.

EXAMPLES 6 TO 8

Using the test methods described above, the calcium carbonate inhibition (dynamic), the dispersing of calcium phosphate and the efficiency in the concentration of sea water are determined for the slightly crosslinked polymaleic acids shown in the Table. For comparison, the properties of the polymaleic acid obtained according to Comparative Example 1 are determined. The values determined for this are likewise shown in the Table.

TABLE

| Example | Slightly crosslinked polymaleic acid according to Example | CaCO$_3$ inhibition (dynamic) % for 2 ppm of added polymer | Dispersing of Ca phosphate, %, for 30 | 45 | 60 ppm of added polymer | Concentration of sea water (volume in ml at which cloudiness occurs) |
|---|---|---|---|---|---|---|
| 6 | 1 | 82.2 | 90.2 | 98.4 | 99.2 | 108 |
| 7 | 2 | 88.3 | 56.3 | 95.6 | 96 | 104 |
| 8 | 4 | 83.3 | 76.5 | 97.2 | 97.2 | 102 |
| Comparative Example 11 | Polymaleic acid according to Comparative Example 1 | 68.5 | 2.1 | 55.0 | 62.9 | 129 |

EXAMPLES OF USE

Test Methods

Dynamic CaCO$_3$ inhibition

This test simulates the formation of deposits of calcium carbonate in a cooling circulation. In this test method, test water with 30° d Ca hardness, 10° d Mg hardness and 56° d carbonate hardness is pumped for 2 hours through a glass spiral heated at 75° C. (flow rate 0.5 l/h). The deposit formed in the spiral is dissolved, and Ca+Mg is determined complexometrically. The inhibitor action is calculated from the amount of deposit in the blank test and in the presence of the corresponding amounts of scale inhibitor.

Dispersing Ca phosphate

This test can be used to determine the dispersant effect on precipitates which have separated out. Here, test water containing 500 ppm of precipitated calcium phosphate at pH 8.5–9 is kept at 100° C. for 1 hour and then transferred to a cylinder. After 1 hour, the Ca content in the middle of the cylinder is determined complexometrically. The dispersant effect is calculated from the amount of dispersed calcium phosphate in the blank test and in the presence of the dispersant. Screening test, desalination of sea water Synthetic sea water (200 ml) according to DIN 50,900 (1960), having an initial salt concentration of 6.15%, is evaporated down at 95° C. until cloudiness is observed. The volume obtained is a measure of the efficiency of the scale inhibitor.

We claim:
1. A process for preparing crosslinked water-soluble polymaleic acid containing less than 1% by weight of unpolymerized maleic anhydride consisting of polymerizing maleic anhydride with from 0.1 to 10% by weight, based on maleic anhydride, of a crosslinking agent selected from a diacrylate of dimethacrylate of a dihydric of polyhydric saturated C$_2$–C$_6$ alcohol or a diacrylate or dimethacrylate of a polyethylene or polypropylene glycol having a molecular weight of from 250 to 9,000, in an aromatic hydrocarbon at 60° to 200° C., in the presence of from 1 to 20% by weight, based on maleic anhydride, of a peroxyester polymerization initiator derived from a saturated C$_4$–C$_{10}$ carboxylic acid and then hydrolyzing the polymer.

2. A process as claimed in claim 1, wherein the polymerization is carried out in benzene, toluene, xylene, ethylbenzene, diethylbenzene, isopropylbenzene, diisopropylbenzene or a mixture thereof at from 80° to 150° C.

3. A process as claimed in claim 1, wherein the polymerization initiator is used in an amount of from 5 to 16% by weight, based on maleic anhydride.

4. A process as claimed in claim 1, wherein the crosslinking agent used is a diacrylate or dimethacrylate of a dihydric saturated alcohol of 2 to 6 carbon atoms.

5. A process as claimed in claim 1, wherein the crosslinking agent used is a diacrylate or dimethacrylate of a polyethylene glycol or a polypropylene glycol having a molecular weight of from 400 to 2,000.

6. A process as claimed in claim 1, wherein the crosslinking agent is used in an amount of from 0.2 to 5% by weight, based on maleic anhydride.

7. A process as claimed in claim 1, wherein the polymerization initiator used is tert-butyl per-2-ethylhexanoate, tert-butyl perpivalate, tert-butyl perbenzoate or a mixture of these.

8. A process as claimed in claim 1, wherein the polymerization initiator used is tert-butyl permaleate.

* * * * *